United States Patent
Bala et al.

(10) Patent No.: US 12,495,320 B2
(45) Date of Patent: Dec. 9, 2025

(54) METHOD AND APPARATUS FOR BEAM MANAGEMENT USING AI/ML

(71) Applicants: RAKUTEN MOBILE, INC., Tokyo (JP); Rakuten Symphony, Inc., Tokyo (JP)

(72) Inventors: Erdem Bala, San Mateo, CA (US); Koichiro Kitagawa, Tokyo (JP); Venkatesh Muralidhara, Bangalore (IN); Hari Swaroop Kanzal Venkatesha, Bangalore (IN); Keerthi Srinivas, Bangalore (IN); Sri Venkata Gautham Thasari, Bangalore (IN)

(73) Assignees: Rakuten Mobile, Inc., San Mateo, CA (US); RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,728

(22) PCT Filed: Nov. 16, 2022

(86) PCT No.: PCT/US2022/050029
§ 371 (c)(1),
(2) Date: Dec. 23, 2022

(87) PCT Pub. No.: WO2024/035419
PCT Pub. Date: Feb. 15, 2024

(65) Prior Publication Data
US 2024/0244460 A1    Jul. 18, 2024

(30) Foreign Application Priority Data
Aug. 10, 2022  (IN) .............................. 202241045765

(51) Int. Cl.
H04L 12/00     (2006.01)
H04L 5/00      (2006.01)
(Continued)

(52) U.S. Cl.
CPC .......... *H04W 24/08* (2013.01); *H04L 5/0048* (2013.01); *H04L 41/16* (2013.01)

(58) Field of Classification Search
CPC .. G06N 3/0464; G06N 20/00; H04B 7/06952; H04L 25/0204; H04L 25/0228; H04L 25/0254; H04L 1/0026
(Continued)

(56) References Cited

U.S. PATENT DOCUMENTS 11,337,095 B2 *   5/2022   Zeng ..................... H04L 5/0057
11,405,088 B2 *   8/2022   Bai ...................... H04B 7/0632
(Continued)

FOREIGN PATENT DOCUMENTS

JP      2012-080522 A       4/2012
WO   WO-2023115567 A1 *   6/2023   ............ G06N 3/098
WO   WO-2024035419 A1 *   2/2024   ........... H04L 5/0048

OTHER PUBLICATIONS

International Search Report issued Mar. 20, 2023 in International Application No. PCT/US22/50029.
(Continued)

*Primary Examiner* — Frantz Coby
(74) *Attorney, Agent, or Firm* — Sughrue Mion, PLLC

(57) ABSTRACT

A method performed by at least one processor in a user equipment (UE), the method including receiving, from a base station over a channel, a plurality of reference signals corresponding to a state of the channel. The method further including measuring a subset of the received plurality of reference signals. The method further including transmitting, to the base station within a first time interval, a channel status report corresponding to the measuring of the subset of the received plurality of reference signals and a prediction of one more reference signals received by the UE after the first time interval.

20 Claims, 11 Drawing Sheets

(51) Int. Cl.
*H04L 41/16* (2022.01)
*H04W 24/08* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 11,483,042 | B2* | 10/2022 | Xue | H04L 1/1861 |
| 11,569,961 | B2* | 1/2023 | Farmanbar | H04B 7/0417 |
| 2020/0259545 | A1* | 8/2020 | Bai | H04B 7/063 |
| 2021/0067297 | A1* | 3/2021 | Farmanbar | H04L 5/0096 |
| 2021/0211912 | A1* | 7/2021 | Zeng | H04L 5/1461 |
| 2021/0351885 | A1 | 11/2021 | Chavva et al. | |
| 2021/0376895 | A1* | 12/2021 | Xue | H04B 7/0626 |
| 2022/0094411 | A1* | 3/2022 | Yoo | H04B 7/0417 |
| 2023/0068245 | A1* | 3/2023 | Khoshnevisan | H04W 72/54 |
| 2023/0130407 | A1* | 4/2023 | Dimou | H04W 24/10 370/329 |
| 2023/0198604 | A1* | 6/2023 | Bhamri | H04B 7/088 375/347 |
| 2023/0276287 | A1* | 8/2023 | Matsumura | H04W 24/10 370/241 |
| 2023/0379030 | A1* | 11/2023 | Sun | H04B 7/0632 |

OTHER PUBLICATIONS

Written Opinion issued Mar. 20, 2023 in International Application No. PCT/US22/50029.
CMCC, "Discussion on other aspects on AIML for beam management", 3GPP TSG RAN WG1 #109-e, e-Meeting, May 9-20, 2022, R1-2204298, pp. 2-6 (5 pages total).
Nokia et al., "Evaluation on ML for beam management", 3GPP TSG RAN WG1 #109, R1-2204573, May 9-20, 2022, pp. 1-19.
Samsung, "Representative sub use cases for beam management", 3GPP TSG RAN WG1 #109-e, R1-2203900, May 9-20, 2022, pp. 1-7.
Huawei et al., "Discussion on AI/ML for beam management", 3GPP TSG RAN WG1 Meeting #109-e, R1-2203143, pp. 1-7.

* cited by examiner

| CSI derived from CSI-RS resource set 0 (e.g., RSRP, tx beam index, rx beam index) | CSI derived from CSI-RS resource set 1 (e.g., RSRP, tx beam index, rx beam index) | CSI derived from CSI-RS resource set 2 (e.g., RSRP, tx beam index, rx beam index) |
| --- | --- | --- |

FIG. 6

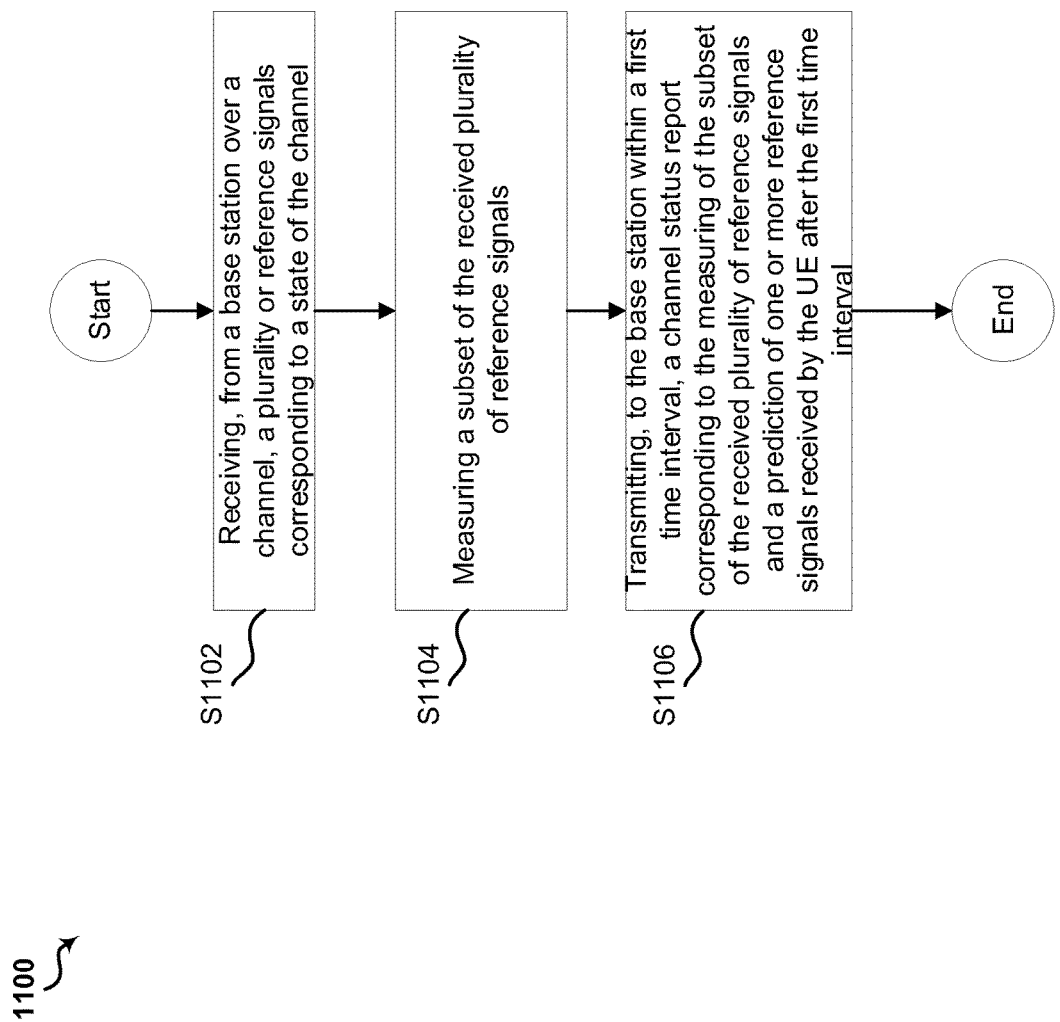

METHOD AND APPARATUS FOR BEAM MANAGEMENT USING AI/ML

CROSS-REFERENCE TO RELATED APPLICATION(S)

This application is a National Stage of International Application No. PCT/US2020/050029 filed Nov. 16, 2022, claiming priority based on Indian Patent Application number 202241045765, filed on Aug. 10, 2022, the disclosure of which is incorporated herein by reference in its entirety.

TECHNICAL FIELD

The present disclosure relates generally to communication systems, and more particularly to methods and apparatuses for beam management using artificial intelligence and machine learning (AI/ML).

BACKGROUND

The time and frequency resources that may be used by the UE to report CSI are controlled by the gNB. CSI may contain Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR. CSI reporting configuration contains the following parameters: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator). CSI reporting may be periodic, aperiodic, or semi-static. A UE may be configured with multiple CSI reporting configurations.

CSI resource configuration contains a configuration of a list of S≥1 CSI Resource Sets where the list is comprised of references to either or both of NZP CSI-RS resource set(s) and SS/PBCH block set(s) or the list is comprised of references to CSI-IM resource set(s). Each CSI-RS resource set contains one or more CSI-RS resources. The time domain behavior of CSI-RS resources may be set to periodic, aperiodic, or semi-persistent. The CSI-RS resources within a set may be transmitted with different transmit beams (e.g., beam sweeping), and the UE can identify the indices of the resources with the largest RSRP. The CSI-RS resources can also be transmitted with the same beam so that the UE may perform beam sweeping. The beam used for transmission in the downlink may be indicated to the UE using the TCI state parameter. The TCI state parameter indicates to the UE that a received channel (e.g., PDCCH or PDSCH) is transmitted with the same beam of a reference signal included in the TCI state parameter.

The prior art technology may be used for beam management. Specifically, the prior art technology may be used by the UE to monitor and measure (e.g., periodically) CSI-RS resources, identify the best beams, and send the information in a CSI report. However, the overhead of transmitting and measuring CSI-RS resources is expected to be large and increase further as the number of transmit and receive beams increases. Thus, there is a need to provide more efficient beam management.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for beam management using AI/ML are disclosed by the present disclosure.

According to an exemplary embodiment, a method performed by at least one processor in a user equipment (UE) includes receiving, from a base station over a channel, a plurality of reference signals corresponding to a state of the channel. The method includes measuring a subset of the received plurality of reference signals. The method further includes transmitting, to the base station within a first time interval, a channel status report corresponding to the measuring of the subset of the received plurality of reference signals and a prediction of one more reference signals received by the UE after the first time interval.

According to an exemplary embodiment, a user equipment (UE) includes at least one memory configured to store computer program code, and at least one processor configured to access said at least one memory and operate as instructed by the computer program code. The computer program code includes receiving code configured to cause at least one of said at least one processor to receive, from a base station over a channel, a plurality of reference signals corresponding to a state of the channel. The computer program code further includes first measuring code configured to cause at least one of said at least one processor to measure a subset of the received plurality of reference signals. The computer program code further includes transmitting code configured to cause at least one of said at least one processor to transmit, to the base station within a first time interval, a channel status report corresponding to the measuring of the subset of the received plurality of reference signals and a prediction of one more reference signals received by the UE after the first time interval.

According to an exemplary embodiment, a non-transitory computer readable medium having instructions stored therein, which when executed by a processor in a user equipment (UE) cause the UE to execute a method including receiving, from a base station over a channel, a plurality of reference signals corresponding to a state of the channel. The method further includes measuring a subset of the received plurality of reference signals. The method further includes transmitting, to the base station within a first time interval, a channel status report corresponding to the measuring of the subset of the received plurality of reference signals and a prediction of one more reference signals received by the UE after the first time interval.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 6 illustrates an example CSI report, in accordance with various embodiments of the present disclosure.

FIG. 11 illustrates a flowchart of an embodiment of a process for performing beam management.

DETAILED DESCRIPTION

Figure 1:
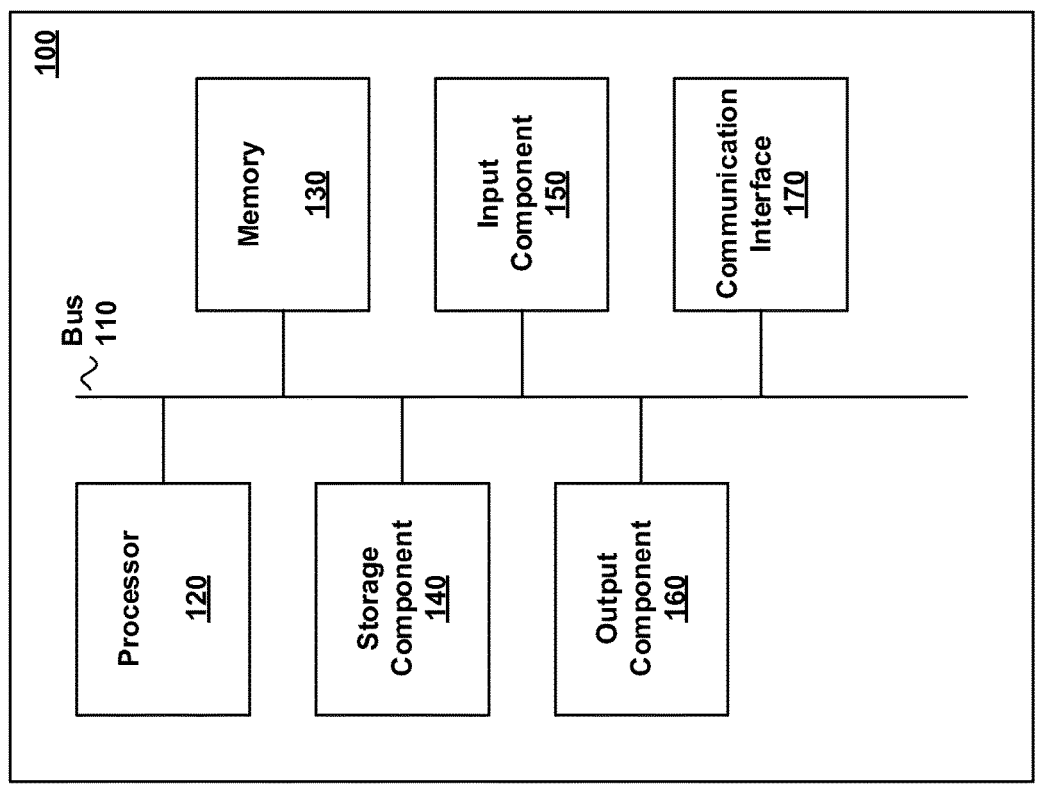
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to an AI/ML based prediction mechanism to reduce beam management overhead. The embodiments of the present disclosure increase the robustness of AI/ML based solutions. In addition, several embodiments of the present disclosure include timing information in a CSI report so that time domain prediction for beam management may be performed using AI/ML.

In the following embodiments, AI/ML based beam management methods are disclosed. For example, the gNB may transmit CSI-RS on a first set of spatial, time, and frequency resources. The UE may perform measurements of the CSI-RS and feedback CSI derived from the measurements. The gNB, using an AI/ML engine, may predict the CSI of a second set of resources where the second set of resources may be different than the first set of resources. The AI/ML engine may reside at the UE side and the UE may also make the CSI prediction.

FIG. 1 is diagram of an example device for performing the embodiments of the present disclosure. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
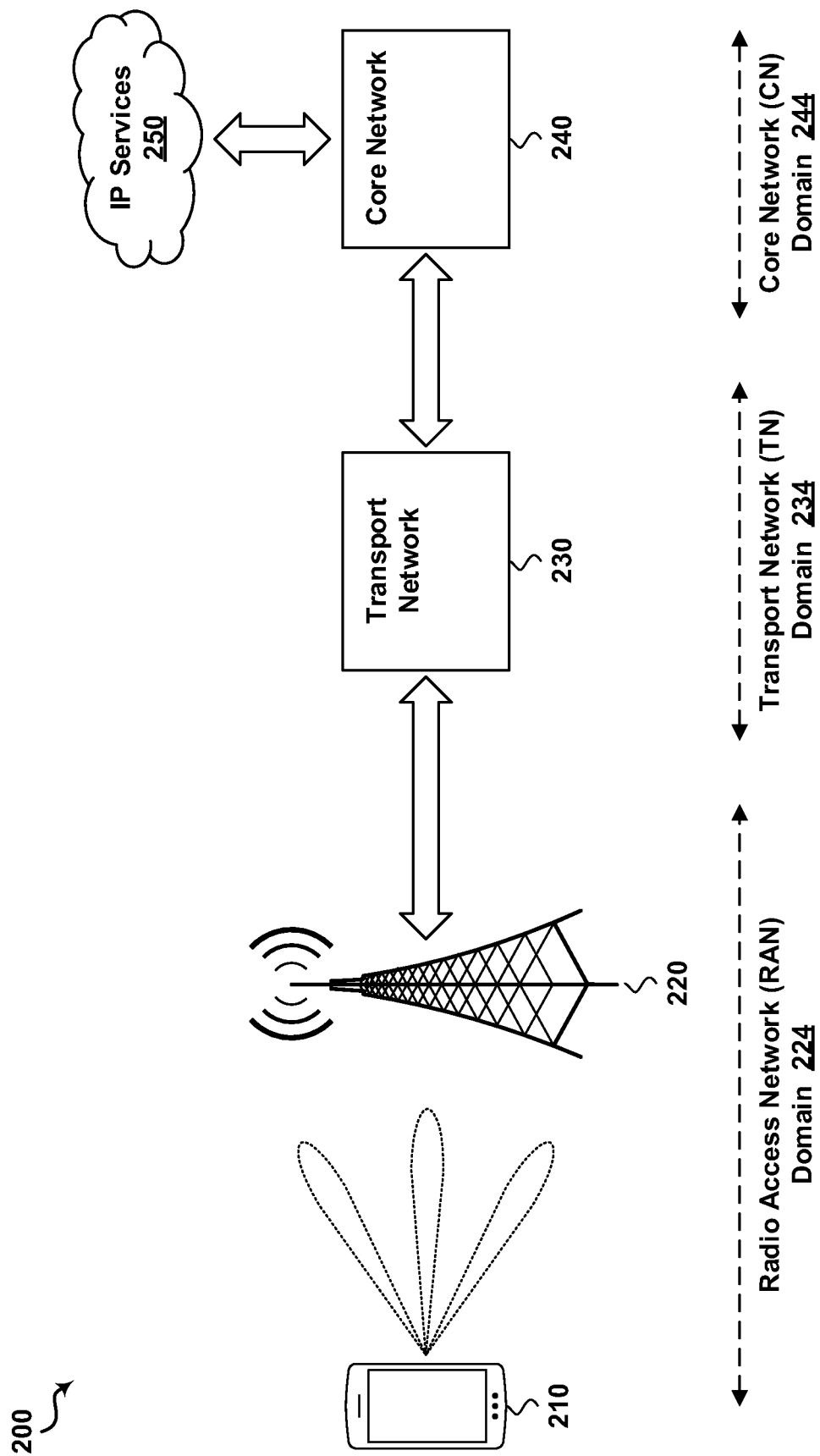
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

In some embodiments, a UE may be configured with a first set of CSI-RS resources and a first subset of the first set of CSI-RS resources. A UE may be indicated to measure the CSI-RS transmitted on a second subset of the first subset of the CSI-RS resources. The first subset and the second subset may be the same resources (e.g., the subsets may contain the same CSI-RS resources). CSI-RS and CSI association may refer to deriving the CSI using at least part or all of the CSI-RS.

The UE may measure the signal quality of the CSI-RS, (e.g., the RSRP of the CSI-RS). This measurement may be performed based on an indication from the base station. The UE may estimate at least one or a plurality of the RSRPs of the CSI-RS, angle of arrival of the CSI-RS, angle of departure of the CSI-RS. The UE may send one or a plurality of the measurement results (e.g., the RSRP values), and the indices of the CSI-RS resources associated with the measurement results to the gNB. Association in this context may refer to deriving the measurement result by measuring the CSI-RS on a specific CSI-RS resource. The CSI-RS resource indices may be based on the full set of CSI-RS resources or the first subset of the CSI-RS resources.

The UE may determine the second subset of CSI-RS resources using one or a plurality of the following embodiments. The UE may be configured and/or indicated to feed back the indices of the measured CSI-RS resources. In some embodiments, the second subset of CSI-RS resources may be fixed and configured by the gNB. The gNB may configure full CSI-RS resources measurement to the UE. In some embodiments, the second subset of CSI-RS resources may be fixed and may be determined by the UE. The determined CSI-RS resources by the UE may be reported to the gNB by, for example, indicating sets of indices(s) that corresponds to the configuration. In some embodiments, the second subset of CSI-RS resources may be fixed for a validity period and may update when the validity period expires. In some embodiments, the second subset of CSI-RS resources may be determined using a predetermined rule.

In some embodiments, the UE may be configured to feedback all of the measured RSRP, N best RSRP, the best RSRP and the associated CSI-RS resource indices. For example, the UE may be configured with 64 CSI-RS resources. The first subset may contain 16 CSI-RS resources and the second subset may contain 8 CSI-RS resources (e.g., 8 out of 16 are measured). The UE may feedback one RSRP (e.g., best RSRP out of 8 RSRPs), N-best RSRP (e.g., N best out of 8 RSRPs), all-best RSRP (e.g., all 8 RSRPs). The indices of the CSI-RS resources associated to the corresponding RSRP may also be fed back. However, when all-best RSRPs are fed back, the indices may not be needed.

In some embodiments, a CSI report may contain CSI related quantities (e.g., RSRP) and an associated timing information component. For example, the timing information may be the time the CSI-RS from which the CSI was derived was transmitted and/or received. The timing information may be a time interval in which the CSI-RS associated to the CSI was transmitted and/or received. The timing information may be based on at least one of a frame index, slot index, symbol index, etc.

The timing information component of a CSI report may be defined with one or more of the following embodiments. In some embodiments, for a CSI report occasion, a reference resource may be defined. The reference resource may compromise time resources (e.g., slot index, symbol index) and frequency resources (e.g., RB index). The CSI report may contain CSI associated to the CSI-RS resource sets defined with respect to the reference resource. One or a plurality of CSI-RS resource sets may be defined with respect to the reference resource. For example, the last CSI-RS resource set before the reference resource, the last two CSI-RS resource sets before the reference resource, the last k (e.g., k an integer) CSI-RS resource sets before the reference resource, etc.

Figure 3:
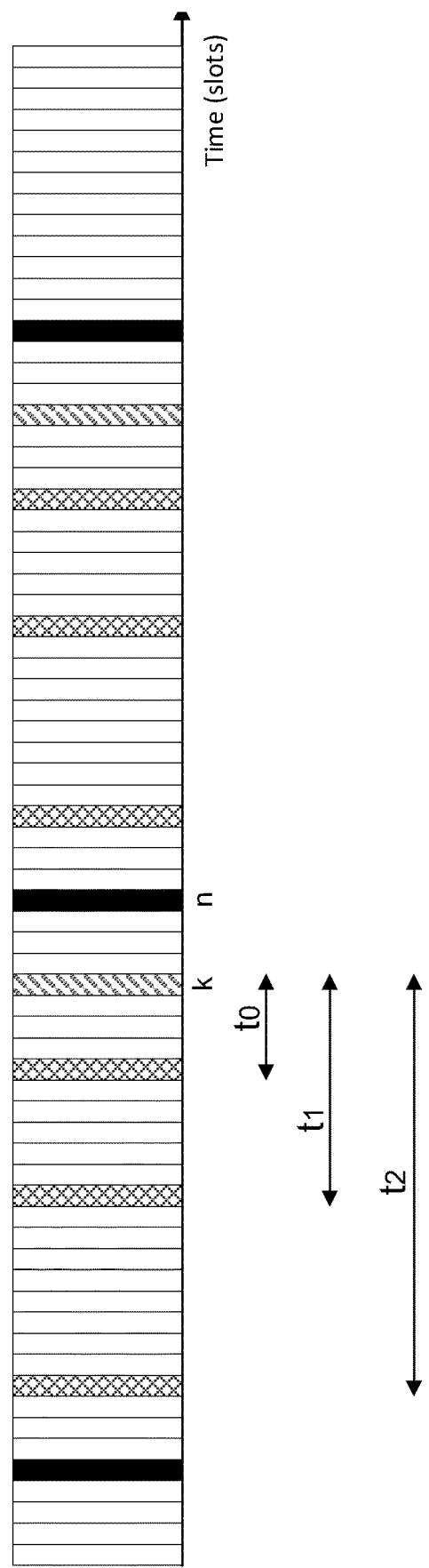
FIG. 3 illustrates example time slots for receiving CSI resources and transmitting a CSI report, in accordance with various embodiments of the present disclosure.

In some embodiments, the CSI report may contain CSI associated to the CSI-RS resource sets defined with respect to the reference resource. An example time sequence 300 is illustrated in FIG. 3. In this example time sequence, a CSI report occasion is configured in slot n and the associated reference resource is in slot k. The associated CSI-RS resource sets (e.g., CSI-RS resource sets 0, 1, and 2) are in slots $k-t_0$, $k-t_1$, and $k-t_2$. In this example, a CSI-RS resource set includes one slot. In other examples, a CSI-RS resource set may comprise a plurality of slots. For example, one CSI-RS resource set of 16 resources may be used to measure the RSRP of 16 transmit beams. Two CSI-RS resource sets of 16 resources each may be used to measure the RSRP of 16 transmit beams and 2 receive beams. In this example, the CSI reported in the CSI report is derived from the last three CSI-RS resource sets before the CSI reference resource. For example, if the CSI is the RSRP, then the report may contain $RSRP_0$, $RSRP_1$, and $RSRP_2$ corresponding to the three CSI-RS resource sets defined with respect to the reference resource.

Figure 4:
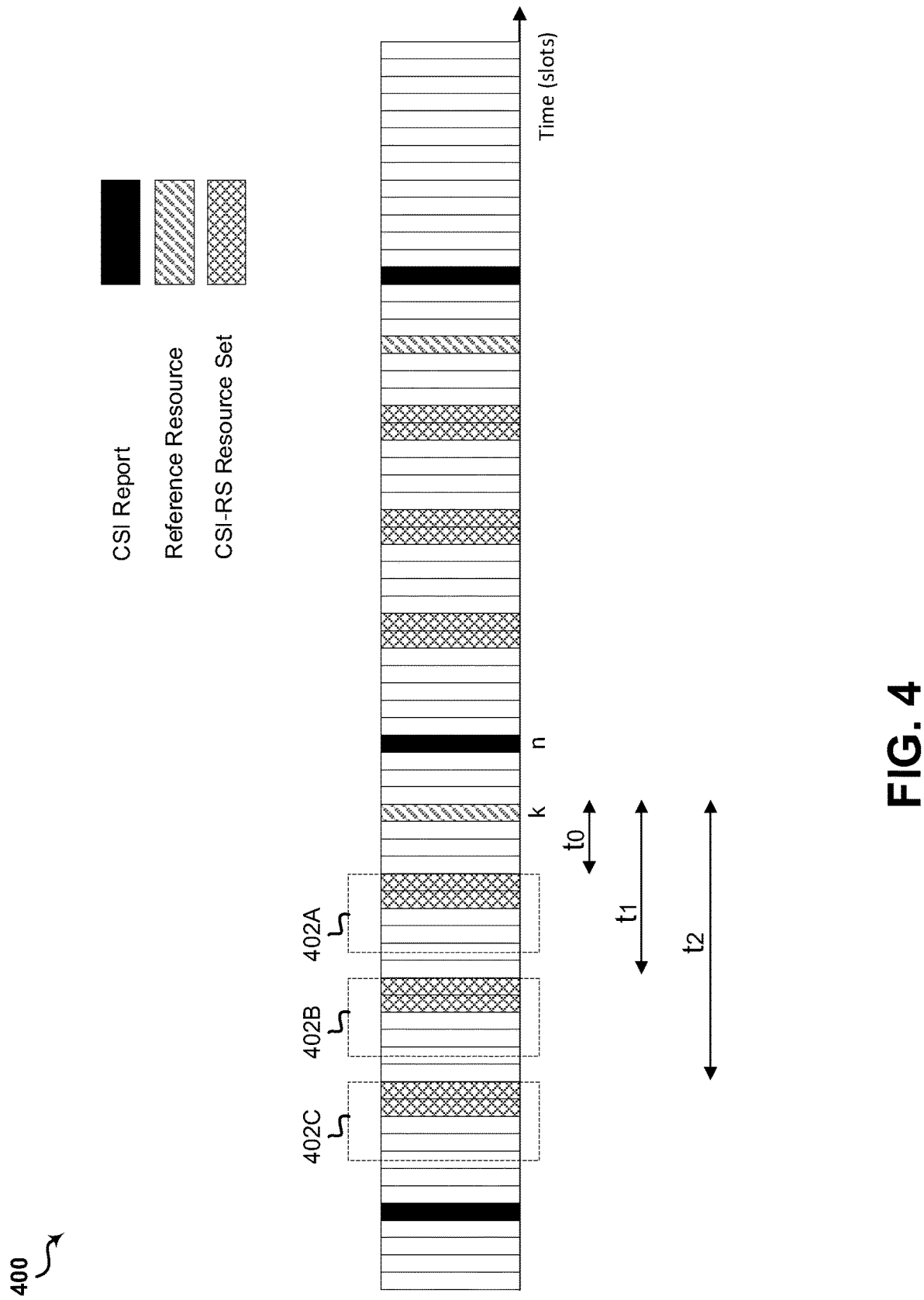
FIG. 4 illustrates example time slots for receiving CSI resources and transmitting a CSI report, in accordance with various embodiments of the present disclosure.

In some embodiments, for a CSI report occasion, a reference resource may be defined. For example, at least one time window may be defined with respect to the reference resource. The time window may be defined using the window's length (e.g., in slots, in ms), and a starting or an ending point in time. The UE may be configured to find the CSI-RS resource sets defined with respect to the reference resource within the time windows. FIG. 4 illustrates an example time sequence 400 with three windows (402A, 402B, 402C) of length L slots (e.g., L an integer). The time windows 402A, 402B, and 402C end in slots $k-t_0$, $k-t_1$, and $k-t_2$, respectively. The CSI report configured in slot n may contain CSI derived from the CSI-RS resource sets within these three windows. In a window, for all disclosed embodiments, more than one CSI-RS resource set may exist, for example, to find a preferred set of transmit/receive beams by performing beam sweeping and/or accumulating measurements over repetitions (e.g., for improved SNR).

In some embodiments, for a CSI report occasion, a reference resource may be defined, where at least one time difference may be configured. The reference resource and the time difference may be used together to determine the associated CSI-RS resource set. For example, assuming $t=k-t_0$, an associated CSI-RS resource set may be the first CSI-RS resource set before t, or the first CSI-RS resource after t.

Figure 5:
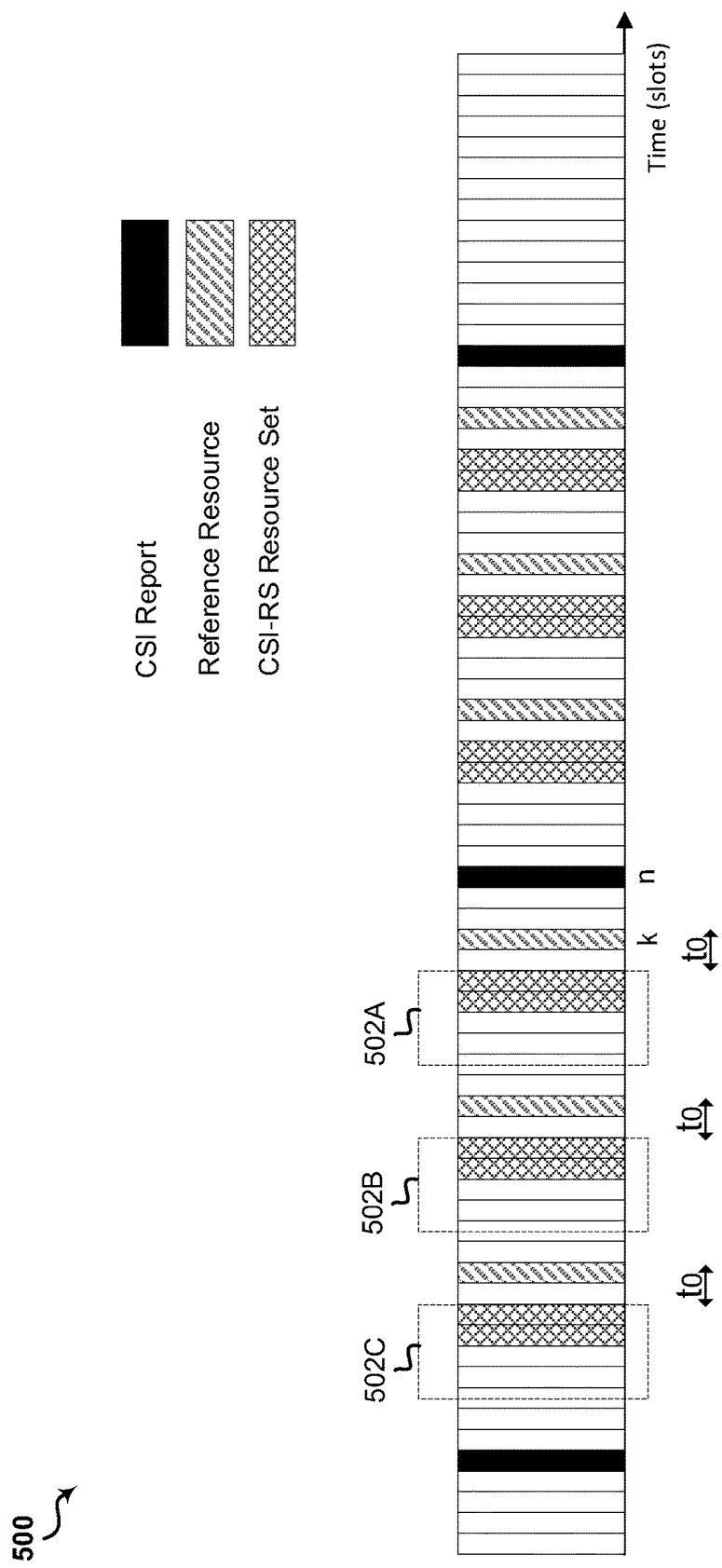
FIG. 5 illustrates example time slots for receiving CSI resources and transmitting a CSI report, in accordance with various embodiments of the present disclosure.

In some embodiments, for a CSI report occasion, a plurality of reference resources may be defined. For each reference resource, at least one CSI-RS resource set may be defined using one of the above disclosed techniques. For example, in FIG. 5, three reference resources are associated to the CSI report configured in slot n. For each reference resource, a CSI-RS resource set (502A, 502B, 502C) is also defined within a window. The CSI report may contain CSI derived from CSI-RS resources defined with respect to the three reference resources.

In some embodiments, the CSI report may contain, for each associated CSI-RS resource set, CSI related quantities such as the N-largest RSRP and the indices of the transmit and/or receive beams for the reported RSRPs. In other embodiments, the RSRP of all transmit and receive beams pairs may be reported along with the beam indices. A transmit beam index may be indicated using the index of the CSI-RS resource on which the beam was transmitted (e.g., the CRI). The CSI-RS resource sets may be linked, for example by using a common parameter. The CSI derived from the linked CSI-RS resource sets may be transmitted in the same CSI report. The timing information of the CSI-RS resource set from which the CSI was derived may be explicitly reported in the CSI report. For example, the CSI report may contain the starting and/or ending point of the CSI-RS resource set (e.g., in slots or ms) used to derive the CSI. The starting/ending points may be defined with respect to the CSI report occasion or the associated reference resource. FIG. 6 illustrates an example CSI report.

In some embodiments, beam management may comprise at least two phases. In the first phase, the UE may measure CSI-RS according to the configuration of the CSI report and associated CSI-RS resource sets. The measurement may be performed over more than one CSI-RS resource set as disclosed above. For each CSI-RS resource set, the UE may feedback the N-best RSRP values, and the corresponding transmit and/or receive beam indices for the largest RSRP values. The following embodiments are applicable similarly if the measured quantity is not an RSRP value.

In some embodiments, after the CSI report is sent, the UE may be provided an indication regarding which beams to use to receive and/or transmit. The beams may be derived based on the CSI report using an AI/ML engine at the gNB. For the indication, a MAC CE may be used to indicate a group of beams and the PDCCH may be used to choose at least one beam out of the group. Each group of beams may be valid for a time interval, and separate groups of beams may be indicated for separate time intervals.

In the second phase, the beam indices selected by the AI/ML engine may be further refined. The UE may measure separate set of CSI-RS resources. The CSI-RS resource sets in the second phase may contain a smaller number of resources than the first phase. In the second phase, the UE may report the K-best RSRP values for a measurement occasion and/or transmit/receive beam indices. As an example, during the first phase, the UE may measure 64

CSI-RS resources and feedback the RSRP of all resources in a CSI report. The gNB, using an AI/ML engine, may predict the best-4 transmit beams to be used in the next 100 ms. During the 100 ms, which is the second phase, the gNB may configure the UE to measure 4 CSI-RS resources, each one for one of the 4 indicated beams. The UE may feedback the best beam and the gNB may use that beam. The best beam may be continuously updated based on new measurements and CSI reports. The second phase may be configured. The second phase may be activated and/or deactivated with PDCCH (e.g., with a 1-bit indication in the PDCCH). The second phase may be deactivated when a timer expires or after a time duration. In one method, the second phase may be activated implicitly. For example, the second phase may be activated if N parameter used in the first phase is larger or smaller than a value. The second phase activation may be determined by a parameter set for the UE. For example, if the UE is a high Doppler UE, then second phase may be activated.

The performance of an AI/ML engine to predict beams in the spatial domain and select the best beams may be evaluated with simulations. In the training phase, 64 transmit and 4 receive beams may be used to train the AI/ML model. In the evaluation phase, only 4 or 8 transmit beams and 4 receive beams are used to select best-N beam pairs where k=1, . . . , 8.

Figure 7:
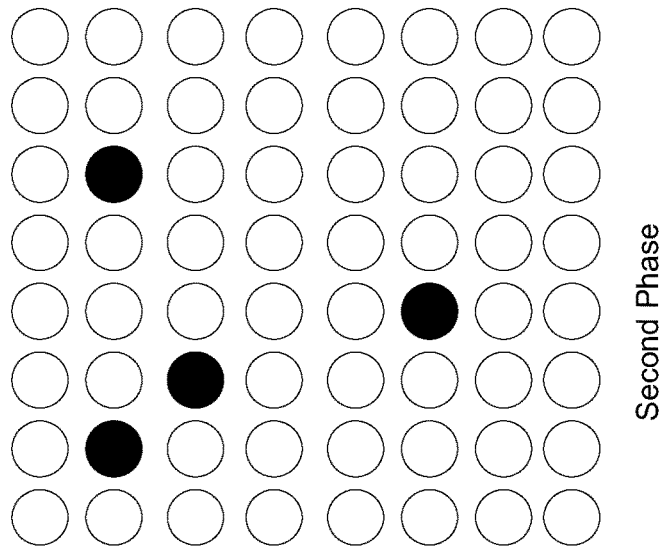
FIG. 7 illustrates an example of receiving CSI resources in multiple phases, in accordance with various embodiments of the present disclosure.
Figure 7:
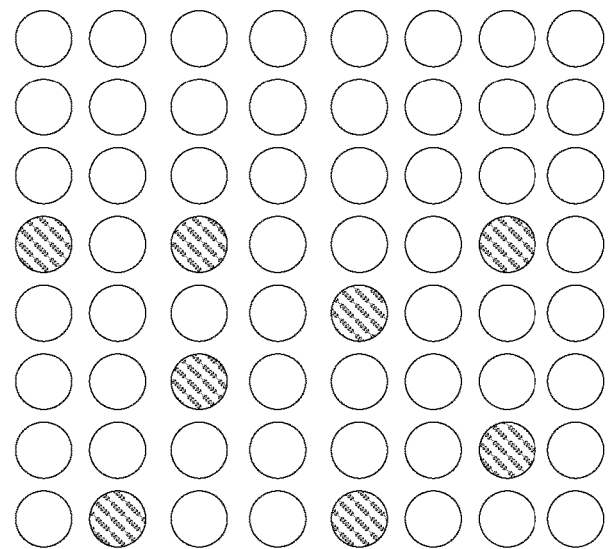
Figure 8:
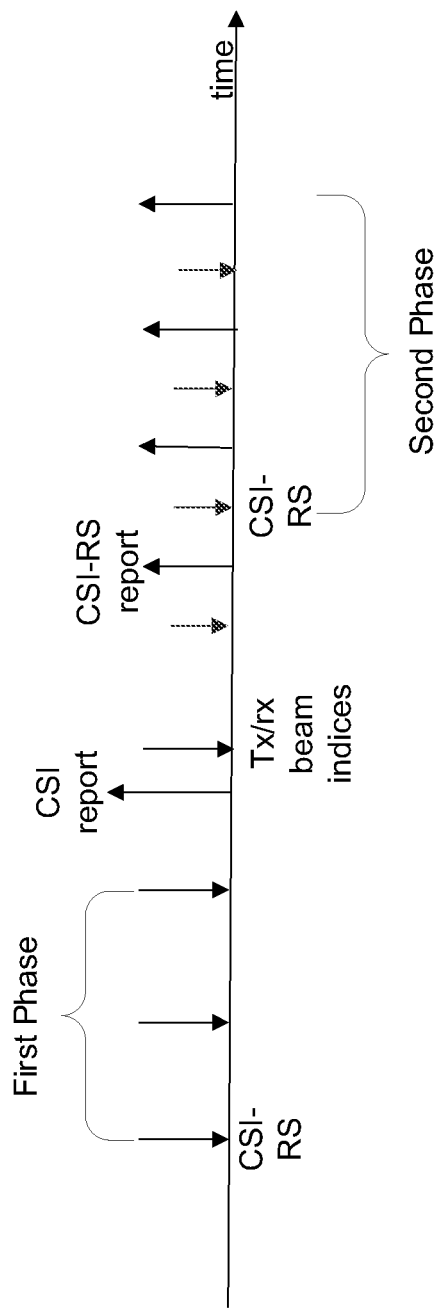
FIG. 8 illustrates an example of receiving CSI resources in multiple phases, in accordance with various embodiments of the present disclosure.

FIG. 7 illustrates example measurements performed when beam management is performed in two phases. In the first phase, the UE may receive 64 resources, and measure 8 of the 64 received resources. Based on the measured resources during the first phase, the 4 best resources of the 64 resources may be predicted. During the second phase, the UE may receive and measure the 4 predicted resources to determine the best resource (e.g., resource with highest power). The UE may subsequently report the best resources to the base station. FIG. 8 further illustrates the reception of resources and reporting of measurements during the first phase and the second phase.

Figure 9:
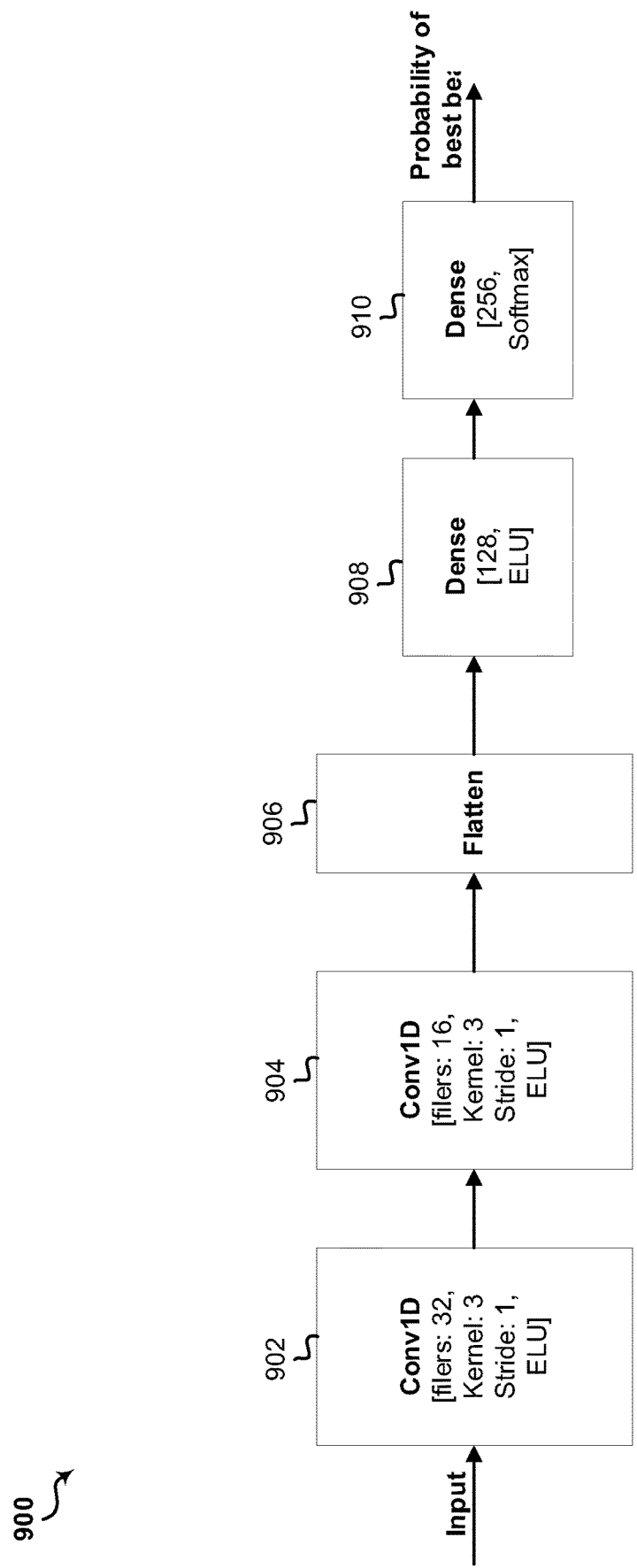
FIG. 9 illustrates an example neural network, in accordance with various embodiments of the present disclosure.
Figure 10:
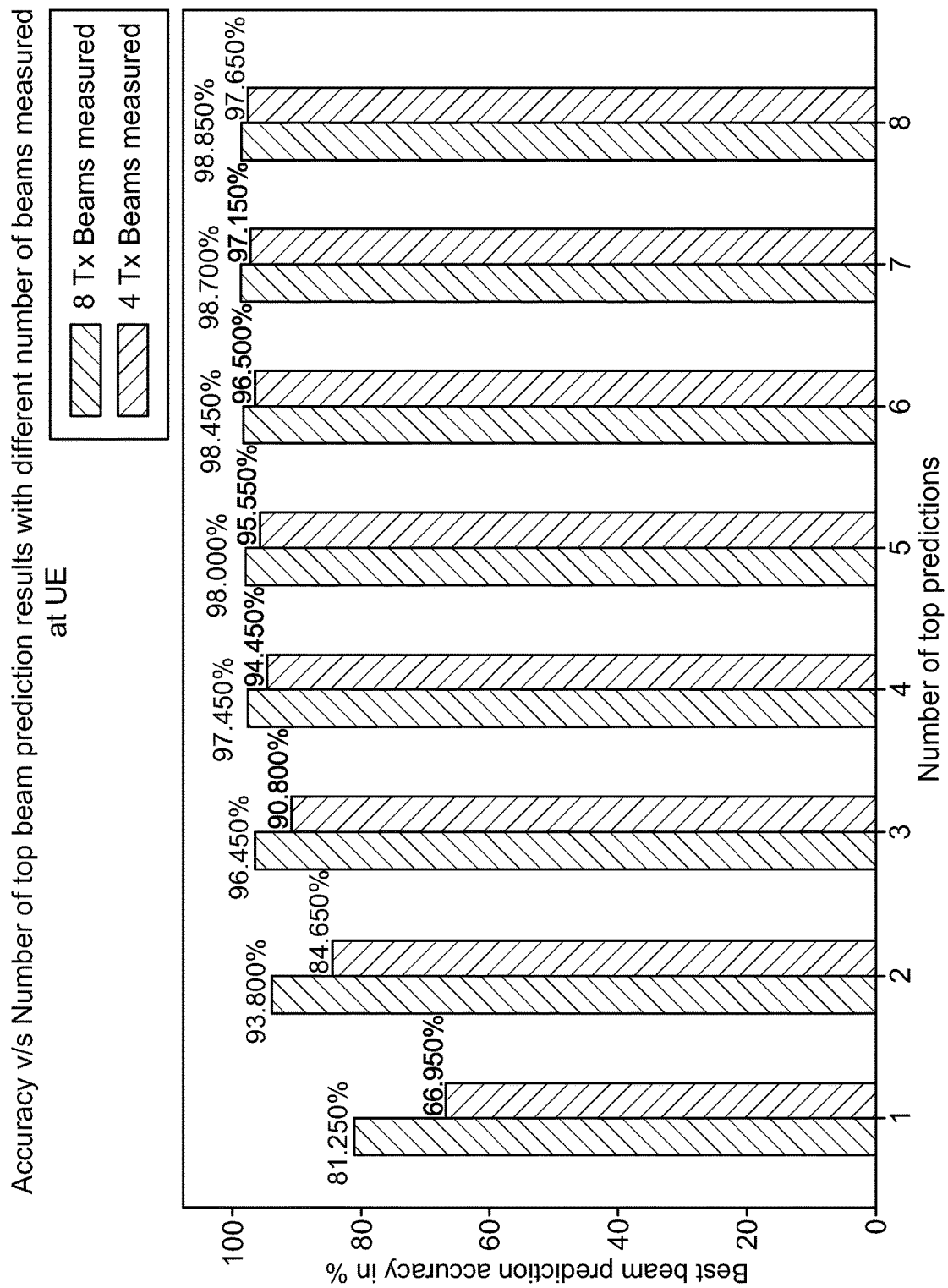
FIG. 10 illustrates an example graph of beam prediction results, in accordance with various embodiments of the present disclosure.

An embodiments of a structure of a sample AI model 900 used for the simulation is shown in FIG. 9. The AI model 900 may contain two 1D convolutional layers (902, 904) followed by a flatten layer 906 and Dense layers (908, 910). The output of the last layer gives the probability of the best beam for all possible beam combinations. To get the N best predictions, the beam indices with the N highest probabilities may be chosen. FIG. 10 illustrates beam prediction results. As illustrated in FIG. 10, as the number of top predictions (e.g., N) increases, the accuracy of the best beam prediction increases.

In some embodiments, the two-step beam management process may also be used during the initial attach process of the UE by measuring the RSRP of the SSB signal. For example, in the first phase, the UE may measure the RSRP of a subset of the SSBs (e.g., 4 SSBs). Using these measurements as input to the AI/ML engine, the UE may predict the top k best beams out of all possible beam pairs. In the second phase, the UE may measure the RSRP of the top k best beams predicted in the first phase, and subsequently choose the best beam to communicate based on the measured RSRP values.

In some embodiments, one or a plurality of TCI states of a channel may be indicated in a MAC CE. The TCI states may be valid for a specific time duration. The TCI states may be configured, and the MAC CE may indicate a subset of the configured TCI states. The TCI state may include the reference signal (e.g., CSI-RS) resource ID, or the SSB ID which is QCL'ed to the channel. These features mean that the UE may assume the reference signal or the SSB is transmitted with the same beam as the channel (e.g., the TCI may be viewed as a beam index indication).

In some embodiments, the validity period may be divided into equal intervals, and for each interval, the TCI state may be indicated in the MAC CE. This feature is illustrated in Table 1, where the validity period is divided into 4 intervals of T slots.

TABLE 1

| TCI state per interval |
| --- |
| TCI state 0 (for 0-1T) |
| TCI state 0 (for 1T-2T) |
| TCI state 1 (for 2T-3T) |
| TCI state 2 (for 3T-4T) |

Other information such as a serving cell ID, CORESET ID, or BWP ID may also be included in the MAC CE. The receive beam index may also be indicated as shown in Table 2.

TABLE 2

| TCI state and rx beam index per interval | |
| --- | --- |
| TCI state 0 (for 0-1T) | rx_beam$_0$ |
| TCI state 0 (for 1T-2T) | rx_beam$_0$ |
| TCI state 1 (for 2T-3T) | rx_beam$_1$ |
| TCI state 2 (for 3T-4T) | rx_beam$_2$ |

The receive beam index may be included in the TCI state as a parameter. A new information element (e.g., receive configuration index), may be defined to include the receive beam index. In other embodiments, the duration during which a TCI state is valid may be indicated explicitly, for example using multiples of T, as shown in Table 3.

TABLE 3

| TCI state and rx beam index and validity duration | | |
| --- | --- | --- |
| 2T | TCI state 0 | rx_beam$_0$ |
| 1T | TCI state 1 | rx_beam$_1$ |
| 1T | TCI state | rx_beam$_2$ |

In other embodiments, for each interval or duration in the validity period, a plurality of TCI states and/or rx beam indices may be indicated with a MAC CE. One TCI state out of the plurality of TCI states and/or one rx beam index out of plurality of rx beams may be further indicated in the PDCCH.

FIG. 11 illustrates an embodiment of a process 1100 for performing beam management. The process 1100 may be performed by a UE. The process 1100 may start at operation S1102 where the UE receives, from a base station over a channel, a plurality of reference signals corresponding to a state of the channel. The process proceeds to operation S1104 where the UE measures a subset of the received plurality of reference signals. For example, if the UE receives 64 references signals, the UE may be configured to measure 8 of the 64 reference signals. The process proceeds to operation S1106 where the UE transmits, to the base station within a first time interval, a channel status report corresponding to the measuring of the subset of the received plurality of reference signals and a prediction of one or more reference signals received by the UE after the first time interval. For example, the UE may transmit a CSI report that includes the N best RSRPs the UE measured, which may be used by the base station to predict the best RSRPs using an AI/ML engine. As another example, the UE may use an AI/ML engine to predict the best RSRPs based on the measured subset of the received plurality of reference signals, where the CSI report includes the predicted RSRPs.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

ABBREVIATIONS

BWP Bandwidth part
CE Control Element
CORESET Control resource set
CQI Channel quality indicator
CRI CSI-RS Resource Indicator
CSI Channel state information
CSI-RS Channel state information reference signal
CSI-RSRP CSI reference signal received power
CSI-RSRQ CSI reference signal received quality
CSI-SINR CSI signal-to-noise and interference ratio
DCI Downlink control information
DL Downlink
DM-RS Demodulation reference signals
L1-RSRP Layer 1 reference signal received power
LI Layer Indicator
MCS Modulation and coding scheme
PDCCH Physical downlink control channel
PDSCH Physical downlink shared channel
PSS Primary Synchronisation signal
PUCCH Physical uplink control channel
QCL Quasi co-location
PMI Precoding Matrix Indicator
PRB Physical resource block
PRG Precoding resource block group
RB Resource block
RBG Resource block group
RI Rank Indicator
RS Reference signal
SS Synchronisation signal
SSB Synchronisation signal block
SSS Secondary Synchronisation signal
SS-RSRP SS reference signal received power
SS-RSRQ SS reference signal received quality
SS-SINR SS signal-to-noise and interference ratio
TCI Transmission Configuration Indicator
TDM Time division multiplexing
UE User equipment
UL Uplink The above disclosure also encompasses the embodiments listed below:

(1) A method performed by at least one processor in a user equipment (UE), the method including: receiving, from a base station over a channel, a plurality of reference signals corresponding to a state of the channel: measuring a subset of the received plurality of reference signals: and transmitting, to the base station within a first time interval, a channel status report corresponding to the measuring of the subset of the received plurality of reference signals and a prediction of one more reference signals received by the UE after the first time interval.

(2) The method according to feature (1), in which the prediction of the one or more reference signals is performed by the base station using an artificial intelligence model learning engine, in which the prediction of the one or more reference signals is based on the measuring of the subset of the received plurality of reference signals.

(3) The method according to feature (1), in which the prediction of the one or more reference signals is performed by the UE using an artificial intelligence model learning engine, in which the prediction of the one or more reference signals is based on the measured subset of the received plurality of reference signals, and in which the channel status report includes the prediction of the one or more reference signals.

(4) The method according to any one of features (1)-(3), in which the predicted one or more reference signals includes at least one reference signal not included in the measured subset of the received plurality of reference signals.

(5) The method according to any one of features (1)-(4), in which the plurality of reference signals include a reference resource signal that specifies the subset of the plurality of reference signals that are measured.

(6) The method according to feature (5), in which the reference resource signal specifies the last K reference signals received before the reference resource signal as the subset of the plurality of reference signals that are measured, in which K is an integer greater than zero.

(7) The method according to feature (5), in which the reference resource signal is received at a slot K, in which K is an integer greater than zero, and in which the references resource signal specifies one or more references signals at one or more intervals with respect to slot K as the subset of the plurality of reference signals that are measured.

(8) The method according to feature (7), in which each interval in the one or more intervals includes at least two reference signals.

(9) The method according to any one of features (1)-(8), further including: measuring the predicted one or more reference signals; determining a reference signal from the measured predicted one or more reference signals that has a highest power level: and reporting, to the base station, the reference signal from the measured predicted one or more reference signals that has the highest power level.

(10) A user equipment (UE) including: at least one memory configured to store computer program code: and at least one processor configured to access said at least one memory and operate as instructed by the computer program code, the computer program code including: receiving code configured to cause at least one of said at least one processor to receive, from a base station over a channel, a plurality of reference signals corresponding to a state of the channel, first measuring code configured to cause at least one of said at least one processor to measure a subset of the received plurality of reference signals, and transmitting code configured to cause at least one of said at least one processor to transmit, to the base station within a first time interval, a channel status report corresponding to the measuring of the subset of the received plurality of reference signals and a prediction of one more reference signals received by the UE after the first time interval.

(11) The UE according to feature (10), in which the prediction of the one or more reference signals is performed by the base station using an artificial intelligence model learning engine, in which the prediction of the one or more reference signals is based on the measuring of the subset of the received plurality of reference signals.

(12) The UE according to feature (10), in which the prediction of the one or more reference signals is performed by the UE using an artificial intelligence model learning engine, in which the prediction of the one or more reference signals is based on the measured subset of the received plurality of reference signals, and in which the channel status report includes the prediction of the one or more reference signals.

(13) The UE according to any one of features (10)-(12), in which the predicted one or more reference signals includes at least one reference signal not included in the measured subset of the received plurality of reference signals.

(14) The UE according to any one of features (10)-(13), in which the plurality of reference signals include a reference resource signal that specifies the subset of the plurality of reference signals that are measured.

(15) The UE according to feature (14), in which the reference resource signal specifies the last K reference signals received before the reference resource signal as the subset of the plurality of reference signals that are measured, in which K is an integer greater than zero.

(16) The UE according to feature (14), in which the reference resource signal is received at a slot K, in which K is an integer greater than zero, and in which the references resource signal specifies one or more references signals at one or more intervals with respect to slot K as the subset of the plurality of reference signals that are measured.

(17) The UE according to feature (16), in which each interval in the one or more intervals includes at least two reference signals.

(18) The UE according to any one of features (10)-(17), in which the computer program code further includes: second measuring code configured to cause at least one of said at least one processor to measure the predicted one or more reference signals, determining code configured to cause at least one of said at least one processor to determine a reference signal from the measured predicted one or more reference signals that has a highest power level, and reporting code configured to cause at least one of said at least one processor to report, to the base station, the reference signal from the measured predicted one or more reference signals that has the highest power level.

(19) A non-transitory computer readable medium having instructions stored therein, which when executed by a processor in a user equipment (UE) cause the UE to execute a method including: receiving, from a base station over a channel, a plurality of reference signals corresponding to a state of the channel: measuring a subset of the received plurality of reference signals: and transmitting, to the base station within a first time interval, a channel status report corresponding to the measuring of the subset of the received plurality of reference signals and a prediction of one more reference signals received by the UE after the first time interval.

(20) The non-transitory computer readable medium according to feature (19), in which the prediction of the one or more reference signals is performed by the base station using an artificial intelligence model learning engine, in which the prediction of the one or more reference signals is based on the measuring of the subset of the received plurality of reference signals.

What is claimed is:

1. A method performed by at least one processor in a user equipment (UE), the method comprising:
receiving, from a base station over a channel, a plurality of reference signals corresponding to a state of the channel;
measuring a subset of the received plurality of reference signals; and
transmitting, to the base station within a first time interval, a channel status report corresponding to the measuring of the subset of the received plurality of reference signals and a prediction of one more reference signals received by the UE after the first time interval.

2. The method according to claim 1, wherein the prediction of the one or more reference signals is performed by the base station using an artificial intelligence model learning engine, wherein the prediction of the one or more reference signals is based on the measuring of the subset of the received plurality of reference signals.

3. The method according to claim 1, wherein the prediction of the one or more reference signals is performed by the UE using an artificial intelligence model learning engine, wherein the prediction of the one or more reference signals is based on the measured subset of the received plurality of reference signals, and wherein the channel status report includes the prediction of the one or more reference signals.

4. The method according to claim 1, wherein the predicted one or more reference signals includes at least one reference signal not included in the measured subset of the received plurality of reference signals.

5. The method according to claim 1, wherein the plurality of reference signals include a reference resource signal that specifies the subset of the plurality of reference signals that are measured.

6. The method according to claim 5, wherein the reference resource signal specifies the last K reference signals received before the reference resource signal as the subset of the plurality of reference signals that are measured, wherein K is an integer greater than zero.

7. The method according to claim 5, wherein the reference resource signal is received at a slot K, wherein K is an integer greater than zero, and wherein the references resource signal specifies one or more references signals at one or more intervals with respect to slot K as the subset of the plurality of reference signals that are measured.

8. The method according to claim 7, wherein each interval in the one or more intervals includes at least two reference signals.

9. The method according to claim 1, further comprising:
receiving the predicted one or more reference signals after the first time interval;
measuring the predicted one or more reference signals, wherein the prediction of the one or more reference signals is performed using an artificial intelligence model and is based on the measuring of the subset of the received plurality of reference signals;

determining a reference signal from the measured predicted one or more reference signals that has a highest power level; and reporting, to the base station, the reference signal from the measured predicted one or more reference signals that has the highest power level.

10. A user equipment (UE) comprising:

at least one memory configured to store computer program code; and at least one processor configured to access said at least one memory and operate as instructed by the computer program code, the computer program code including:

receiving code configured to cause at least one of said at least one processor to receive, from a base station over a channel, a plurality of reference signals corresponding to a state of the channel, first measuring code configured to cause at least one of said at least one processor to measure a subset of the received plurality of reference signals, and transmitting code configured to cause at least one of said at least one processor to transmit, to the base station within a first time interval, a channel status report corresponding to the measuring of the subset of the received plurality of reference signals and a prediction of one more reference signals received by the UE after the first time interval.

11. The UE according to claim 10, wherein the prediction of the one or more reference signals is performed by the base station using an artificial intelligence model learning engine, wherein the prediction of the one or more reference signals is based on the measuring of the subset of the received plurality of reference signals.

12. The UE according to claim 10, wherein the prediction of the one or more reference signals is performed by the UE using an artificial intelligence model learning engine, wherein the prediction of the one or more reference signals is based on the measured subset of the received plurality of reference signals, and wherein the channel status report includes the prediction of the one or more reference signals.

13. The UE according to claim 10, wherein the predicted one or more reference signals includes at least one reference signal not included in the measured subset of the received plurality of reference signals.

14. The UE according to claim 10, wherein the plurality of reference signals include a reference resource signal that specifies the subset of the plurality of reference signals that are measured.

15. The UE according to claim 14, wherein the reference resource signal specifies the last K reference signals received before the reference resource signal as the subset of the plurality of reference signals that are measured, wherein K is an integer greater than zero.

16. The UE according to claim 14, wherein the reference resource signal is received at a slot K, wherein K is an integer greater than zero, and wherein the references resource signal specifies one or more references signals at one or more intervals with respect to slot K as the subset of the plurality of reference signals that are measured.

17. The UE according to claim 16, wherein each interval in the one or more intervals includes at least two reference signals.

18. The UE according to claim 10, wherein the computer program code further includes:

additional receiving code configured to cause at least one of said at least one processor to receive the predicted one or more reference signals after the first time interval;

second measuring code configured to cause at least one of said at least one processor to measure the predicted one or more reference signals, wherein the prediction of the one or more reference signals is performed using an artificial intelligence model and is based on the measuring of the subset of the received plurality of reference signals, determining code configured to cause at least one of said at least one processor to determine a reference signal from the measured predicted one or more reference signals that has a highest power level, and reporting code configured to cause at least one of said at least one processor to report, to the base station, the reference signal from the measured predicted one or more reference signals that has the highest power level.

19. A non-transitory computer readable medium having instructions stored therein, which when executed by a processor in a user equipment (UE) cause the UE to execute a method comprising:

receiving, from a base station over a channel, a plurality of reference signals corresponding to a state of the channel;

measuring a subset of the received plurality of reference signals; and transmitting, to the base station within a first time interval, a channel status report corresponding to the measuring of the subset of the received plurality of reference signals and a prediction of one more reference signals received by the UE after the first time interval.

20. The non-transitory computer readable medium according to claim 19, wherein the prediction of the one or more reference signals is performed by the base station using an artificial intelligence model learning engine, wherein the prediction of the one or more reference signals is based on the measuring of the subset of the received plurality of reference signals.

* * * * *